United States Patent
Nagata et al.

(10) Patent No.: US 7,332,888 B2
(45) Date of Patent: Feb. 19, 2008

(54) DRIVING APPARATUS FOR A MOTOR

(75) Inventors: Koichiro Nagata, Mito (JP); Toshiaki Okuyama, Tokai (JP); Haruo Nemoto, Hitachinaka (JP); Toshio Katayama, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 24 days.

(21) Appl. No.: 11/359,405

(22) Filed: Feb. 23, 2006

(65) Prior Publication Data

US 2006/0192521 A1    Aug. 31, 2006

(30) Foreign Application Priority Data

Feb. 25, 2005   (JP)   ............... 2005-049922

(51) Int. Cl.
*H02P 27/04* (2006.01)
(52) U.S. Cl. ............ 318/801; 318/727; 318/805; 318/799; 318/798
(58) Field of Classification Search ........... 318/727, 318/799, 798, 811, 800–806, 812, 813, 609, 318/610, 138, 254
See application file for complete search history.

(56) References Cited

U.S. PATENT DOCUMENTS 6,909,257 B2 * 6/2005 Inazumi ............... 318/727

FOREIGN PATENT DOCUMENTS

JP    3070391    5/2000

* cited by examiner

*Primary Examiner*—Karen Masih
(74) *Attorney, Agent, or Firm*—Antonelli, Terry, Stout & Kraus, LLP.

(57) ABSTRACT

A motor driving apparatus includes: a current instruction calculator, for calculating a current instruction value based on a deviation between a speed instruction value and an estimated speed value; a current controller, for controlling an output current based on the current instruction value; a frequency instruction calculator, for calculating a frequency instruction value based on an output voltage instruction value or an output voltage detection value, wherein, when an induction motor is to be activated, the current instruction value and the frequency instruction value are calculated directly using the speed instruction value, and an output current and an output frequency are controlled in accordance with the current instruction value and the frequency instruction value.

15 Claims, 8 Drawing Sheets

DRIVING APPARATUS FOR A MOTOR

BACKGROUND OF THE INVENTION

The present invention relates to a motor driving apparatus that drives an induction motor at variable speeds, and relates in particular to a driving apparatus that can output a high torque at the time a motor is activated.

Figure 8:
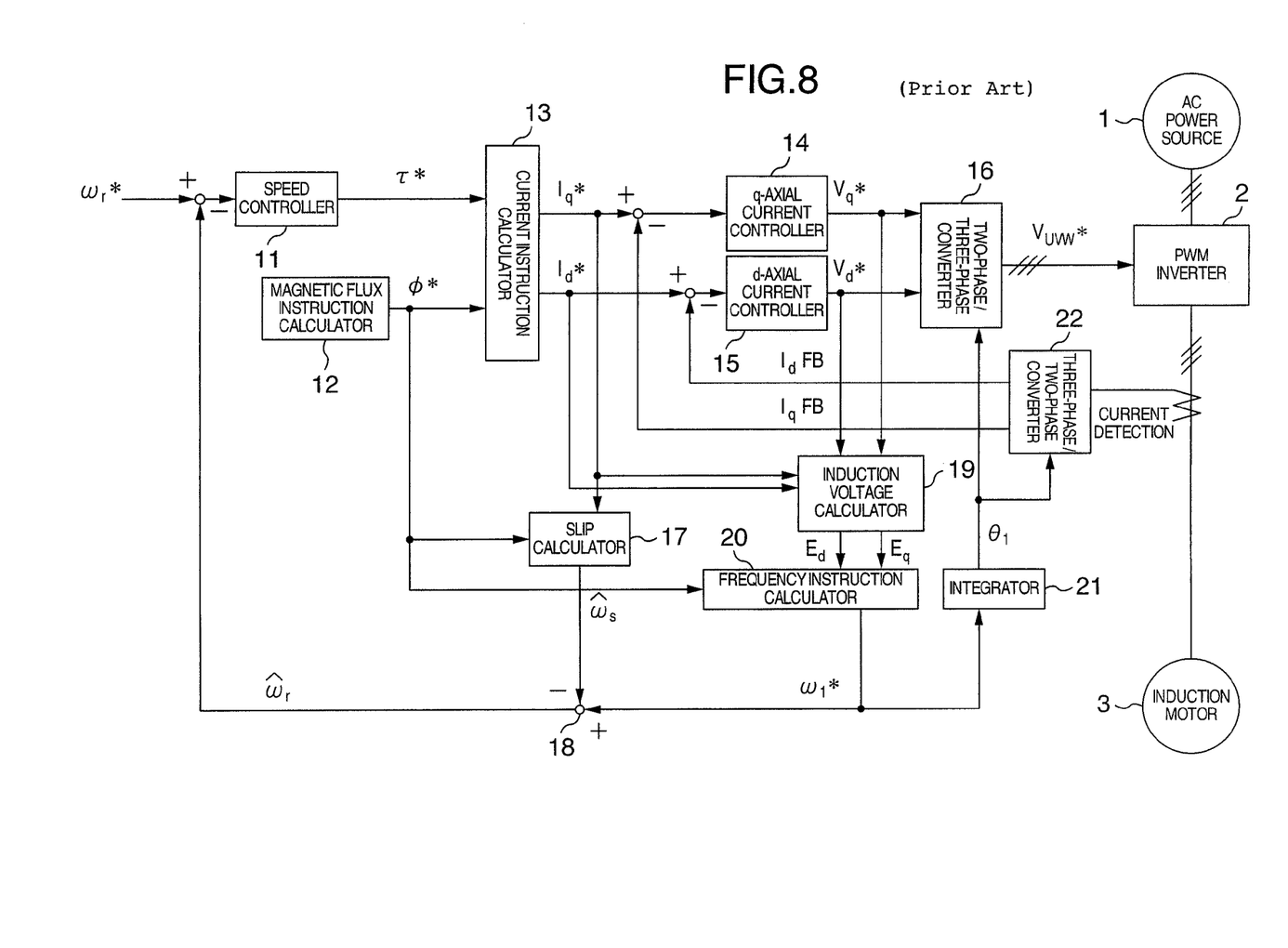
FIG. 8 is a diagram showing the configuration of a conventional motor driving apparatus.

Recently, variable-speed driving of motors using an inverter has been developed to save energy and prevent global warming, or to provide improved efficiency for production lines. FIG. 8 is a diagram showing a conventional example system for controlling an induction motor. In FIG. 8, a speed controller 11 calculates a torque instruction τ*, and a current instruction calculator 13 employs the torque instruction value τ* and a magnetic flux instruction Φ*, received from a magnetic flux instruction calculator 12, to calculate a torque current instruction Iq* (perpendicular to the magnetic flux of a motor) and an excited current instruction Id* (parallel to the magnetic flux of the motor), so that an estimated speed value ωr^ matches a speed instruction value ωr*.

That is, the speed controller 11, the flux instruction calculator 12 and the current instruction calculator 13 constitute current instruction calculation means for calculating a current instruction value based on a deviation between the speed instruction value ωr* and the estimated speed value ωr^. Since the control process is performed by dividing current elements into those along the axis (d axis) parallel to magnetic flux elements and those along the perpendicular axis (q axis), this process is also called a vector control process. A Q-axial current controller 14 and a d-axial current controller 15 calculate a q-axial voltage instruction Vq* and a d-axial voltage instruction Vd*, so that a torque current detection value IqFB=the torque current instruction Iq* and an excited current detection value IdFB=the excited current instruction Id* are established. These controllers 14 and 15 constitute current control means for controlling a current based on a current instruction value. The d-axial voltage instruction Vd* and the q-axial voltage instruction Vq* are converted into three-phase AC voltage instructions Vu*, Vv* and Vw* by employing a phase θ1, which is obtained by performing the integration of a frequency instruction value ω1* for an inverter that will be described later. Then, a PWM inverter 2, which is connected to a three-phase AC power source 1, performs PWM modulation for the three-phase instructions, and transmits the results, as the output voltage of the three-phase AC inverter, to an induction motor 3. The PWM inverter 2 performs switching by employing a semiconductor device, such as an IGBT. An induction voltage calculator 19 employs, for example, the following expressions (1) and (2) to convert the d-axial voltage instruction Vd* and the q-axial voltage instruction Vq* into motor induction voltages Ed and Eq. In these expressions, r1 denotes the primary resistance of a motor, Lσ denotes the sum of primary reduced values of leakage inductances of the motor, and P denotes a differential operator (d/dt).

$$Ed = Vd^* - r1 \times Id - L\sigma \times P \times Id + \omega1 \times L\sigma \times Iq \quad (1)$$

$$Ed = Vq^* - r1 \times Iq - L\sigma \times P \times Iq - \omega1 \times L\sigma \times Id \quad (2)$$

$$\omega1^* = Eq/\Phi^* \quad (3)$$

The induction voltage calculator 19 and the frequency instruction calculator 20 constitute frequency instruction calculation means that employs the output voltage instruction value to calculate the frequency instruction value ω1* in the above described manner. It should be noted that the frequency instruction value ω1* may be calculated by employing a voltage detection value, instead of the voltage instruction value.

Based on expression (4), a slip calculator 17 employs the torque current instruction Iq* and the magnetic flux instruction Φ* to calculate an estimated slip speed value ωs^ for the motor. Further, in accordance with expression (5), a speed addition unit 18 calculates the estimated speed value ωr^ for the motor. It should be noted that in expression (4), T2 denotes a secondary time constant of the motor, and M denotes a mutual inductance of the motor.

$$\omega s^\wedge = 1/T2 \times M \times Iq^*/\Phi^* \quad (4)$$

$$\omega r^\wedge = \omega1^* - \omega s^\wedge \quad (5)$$

In this manner, the torque instruction value τ* is determined so that the estimated speed value ωr^ matches the speed instruction value ωr*. Then, a current is controlled so as to match the excited current instruction Id* and the torque current instruction Iq*, which are determined in accordance with the torque instruction value τ*. It should be noted that the torque instruction value τ* may be provided directly as an operating instruction, instead of being obtained through calculations based on a deviation between the speed instruction value ωr* and the estimated speed value ωr^.

Further, another method is disclosed in Japanese Patent No. 3070391 (paragraph [0011]), for example, whereby, when a large torque must be generated at the time a motor is activated, a magnetic flux instruction value is raised to obtain increased torque (∝ magnetic flux of a motor×a current).

SUMMARY OF THE INVENTION

Expressions (6) and (7) represent the relation between a d-axial magnetic flux Φd2 and a q-axial magnetic flux Φ2q of a motor. Iq and Id denote an actual torque current and an actual excited current, and an actual slip speed ωw is a difference between an inverter frequency ω1 and an actual speed ωr of a motor.

$$\Phi2d = 1/(1+T2 \cdot s) \times (M \times Id + T2 \times \omega s \times \Phi2q) \quad (6)$$

$$\Phi2q = 1/(1+T2 \cdot s) \times (M \times Iq + T2 \times \omega s \times \Phi2d) \quad (7)$$

In the above described vector control process, the actual slip speed ωs is appropriately controlled, so that d-axial magnetic flux Φ2d=M×Id and the q-axial magnetic flux Φ2q=0 are established. When the motor is not rotating, the actual slip speed ωs=inverter frequency ω1 is established. When the actual slip speed ωs/actual torque current Iq is increased, the q-axial magnetic flux Φ2q becomes smaller than 0, and as a result, the d-axial magnetic flux Φ2d is lowered and a desired torque may not be obtained.

Further, when there is an error in the constant of the motor in expression (1) or (2), accordingly, an error occurs in the frequency instruction value ω1* or the estimated speed value ωr^. When such an error occurs, the actual slip speed ωs becomes greater than the appropriate value, the magnetic flux is reduced, and a large torque may not be obtained. In addition, when a magnetic flux instruction value is increased, the magnetic flux of the motor is saturated, so that an actual magnetic flux may not be generated as instructed, and a large torque may not be output.

One objective of the present invention is to provide a motor driving apparatus that removes the adverse effects of the above described problems, and outputs a large, desired torque when a motor is activated.

To achieve this objective, according to the present invention, a motor driving apparatus comprises:

a current instruction calculator, for calculating a current instruction value based on a deviation between a speed instruction value and an estimated speed value;

a current controller, for controlling an output current based on the current instruction value;

a frequency instruction calculator, for calculating a frequency instruction value based on an output voltage instruction value or an output voltage detection value, wherein, when an induction motor is to be activated, the current instruction value and the frequency instruction value are calculated directly using the speed instruction value, and an output current and an output frequency are controlled in accordance with the current instruction value and the frequency instruction value. Further, at the time of activation, the ratio of a frequency to a current is adjusted to a predetermined value, and slip speed/current is lower than after activation. The motor driving apparatus further comprises:

a slip calculator, for calculating slip speed for the induction motor based on either a torque current element of the current instruction value or a torque current detection value, and either a magnetic flux instruction value or an excited current instruction value, wherein the slip speed for the induction motor that is activated is lower than a predetermined speed following the activation.

According to the present invention, when the induction motor is activated, the output current and the output frequency are adjusted in accordance with the speed instruction value, and the slip speed is adjusted to low, instead of the magnetic flux instruction value being increased. Thus, a reduction in the magnetic flux that is caused by excessive slip due to an error in the estimated speed can be prevented, and a desired torque can be output.

Other objects, features and advantages of the invention will become apparent from the following description of the embodiments of the invention taken in conjunction with the accompanying drawings.

DESCRIPTION OF THE EMBODIMENTS

The present invention will now be described in detail while referring to the accompanying drawings.

First Embodiment

Figure 1:
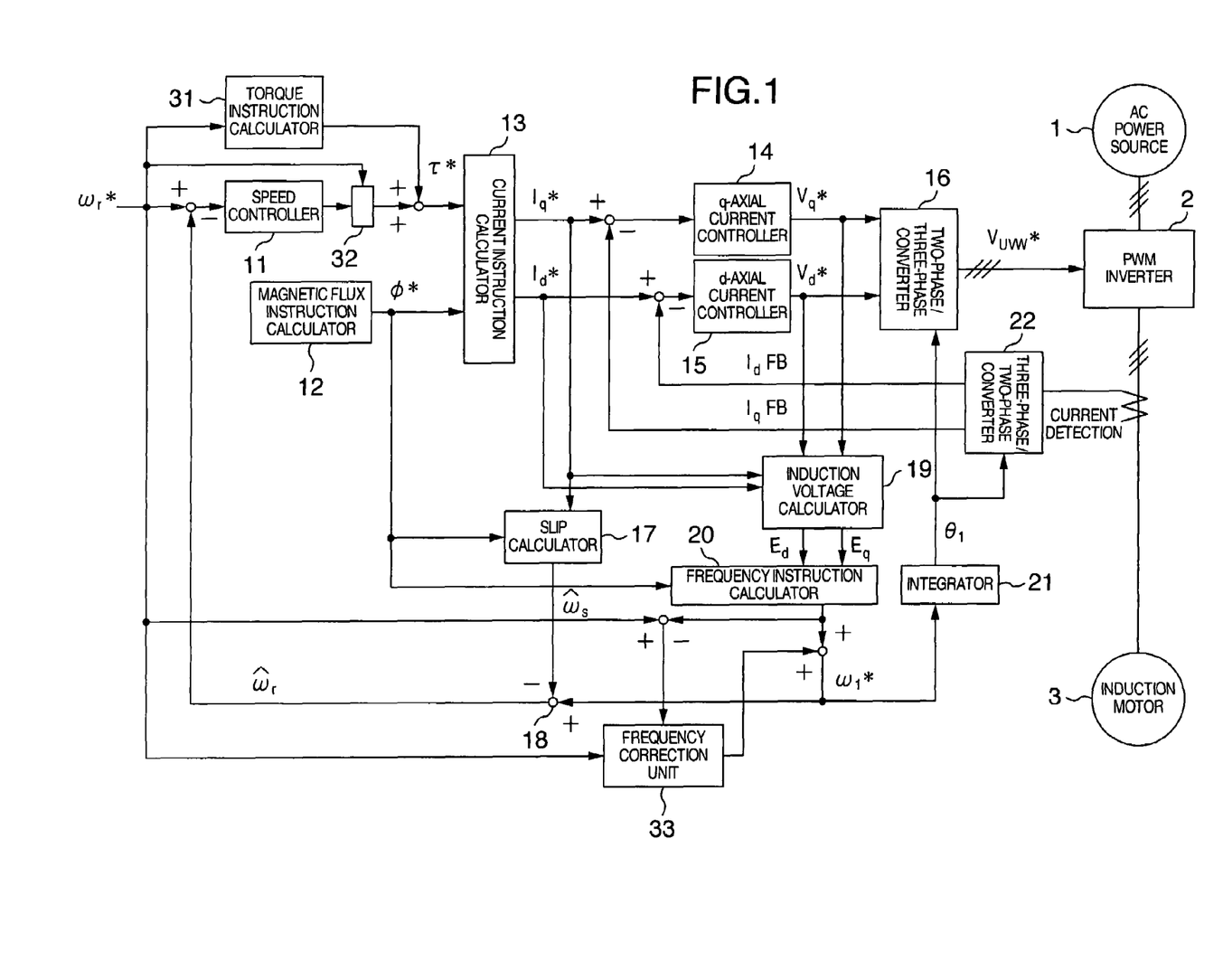
FIG. 1 is a diagram showing the configuration of a motor driving apparatus according to a first embodiment of the present invention.

For a motor driving apparatus of a first embodiment of the present invention, different portions of the conventional example in FIG. 8 will now be described while referring to FIG. 1. A speed controller 11 calculates a first torque instruction, and a torque instruction calculator 31 calculates a second torque instruction in accordance with a speed instruction value $\omega r^*$. An instruction obtained by synthesizing the first torque instruction and the second torque instruction is called a torque instruction $\tau^*$. At the time of activation, a speed control output correction unit 32 reduces the output of the speed controller 11 to zero. As a result, at the time of activation the torque instruction $\tau^*$ is calculated in accordance with the speed instruction value $\omega r^*$, and further, an excited current instruction value Id* and a torque current instruction value Iq* are calculated by a current instruction calculator 13. It should be noted that "the time of activation" designates the period of instantaneous excitement of a motor from zero to rotation, and "after the activation" designates the state wherein the motor is rotating at a predetermined speed, i.e., at 10% or more of the rated speed.

In this embodiment, a determination as to the time of activation, or after the activation, is performed to decide whether the speed instruction value $\omega r^*$ has reached a value corresponding to a predetermined speed. However, time, for example, may be employed as a reference, and when a predetermined period of time has elapsed following the start of the operation of a driving apparatus, "after the activation" may be determined. Or when a torque corresponding value (=a voltage×a current/a speed) is raised to a predetermined value or greater, and is dropped again to its previous value, "after the activation" may be determined. At the time of activation, a frequency correction unit 33 corrects a frequency instruction value $\omega 1^*$, so that there is zero deviation between the frequency instruction value $\omega 1^*$ and the speed instruction value $\omega r^*$. During this process, unlike expression (5), which is used for the conventional example, and without depending on the estimated speed value $\omega \hat{r}$ or the estimated slip speed value $\omega \hat{s}$, the frequency instruction value $\omega 1^*$ is calculated based on the speed instruction value $\omega r^*$, as shown in expression (8).

$$\omega 1^* = \omega r^* \tag{8}$$

Thus, in this embodiment, at the time of activation, the excited current instruction Id*, the torque current instruction Iq* and the frequency instruction $\omega 1^*$ are calculated in accordance with the speed instruction value $\omega r^*$, in order to remove the adverse effects of the frequency instruction value $\omega 1^*$ error and the estimated speed error, which conventionally occur during the calculation of the voltage instruction value or the voltage detection value. Thereafter, when the motor is started, and when the speed instruction value $\omega r^*$ has reached a predetermined speed, e.g., 10% of the rated speed, the output of the speed control output correction unit 32 is returned from zero to equal that of the output value of the speed controller 11, and the output values of the torque instruction calculator 31 and the frequency correction unit 33 are reduced to zero. As a result, following the activation, as in the conventional example, the estimated speed value $\hat{\omega r}$ and the estimated slip speed value $\hat{\omega s}$ are employed to perform the control process. It should be noted that the output of the speed control output correction unit 32 may be adjusted to a small value, rather than to zero.

In this embodiment, at the time of activation, the actual slip speed ωs=frequency instruction value ω1*=speed instruction value ωr* is established. Further, since the flow of the actual torque current Iq is proportional to the actual slip speed ωs, both the frequency and the current are proportional to the speed instruction value ωr*. Therefore, the ratio of the frequency to the current at the time of activation is a predetermined value, e.g., a constant value. Furthermore, since the output of the torque instruction calculator 31 is adjusted at the time of activation, the value of the actual slip speed ωs, (the frequency instruction value ω1* at the time of activation)/the current, is smaller than the value after the activation. Therefore, magnetic flux reduction can be prevented, and a desired torque can be generated. It should be noted that in this embodiment $I1=\sqrt{(IqFB^2+IdFB^2)} \approx Iq$ is employed, in addition to the actual torque current Iq and the torque current detection value IqFB.

Furthermore, the speed instruction value ωr* is gradually increased from zero at a predetermined time change rate, so that a sharp increase in the actual slip speed ωs and the magnetic flux reduction are prevented, and a desired torque can be generated. At this time, the change rates for the frequency and the current should be proportional to the change rate for the speed instruction value ωr*. At the time of activation, the ratio of the changes for the frequency and the current is set to a predetermined value, i.e., a constant value, which should be smaller than that following the activation. For example, the speed instruction value ωr* is changed so it is approximately the equivalent of the rated slip speed, and the output current is changed so it is approximately the equivalent of the rated current. When the speed instruction value ωr* is increased, at a time change rate faster than (the rated slip speed/the secondary time constant of the motor)/10, until it reaches a predetermined value (e.g., about (the rated slip speed×a desired torque/the rated torque×2)), the torque is also increased, until it finally reaches a desired value.

As described above, according to this embodiment, at the time of activation, the excited current instruction Id*, the torque current instruction Iq* and the frequency instruction value ω1* are calculated in accordance with the speed instruction value ωr*, without being affected by the estimated slip speed value $\hat{\omega s}$ and the estimated speed value $\hat{\omega r}$. And the actual slip speed ωs (the frequency instruction value ω1* at the time of activation)/the current value can be adjusted to a small value, magnetic flux reduction can be reduced, and a desired torque can be generated.

Second Embodiment

Figure 2:
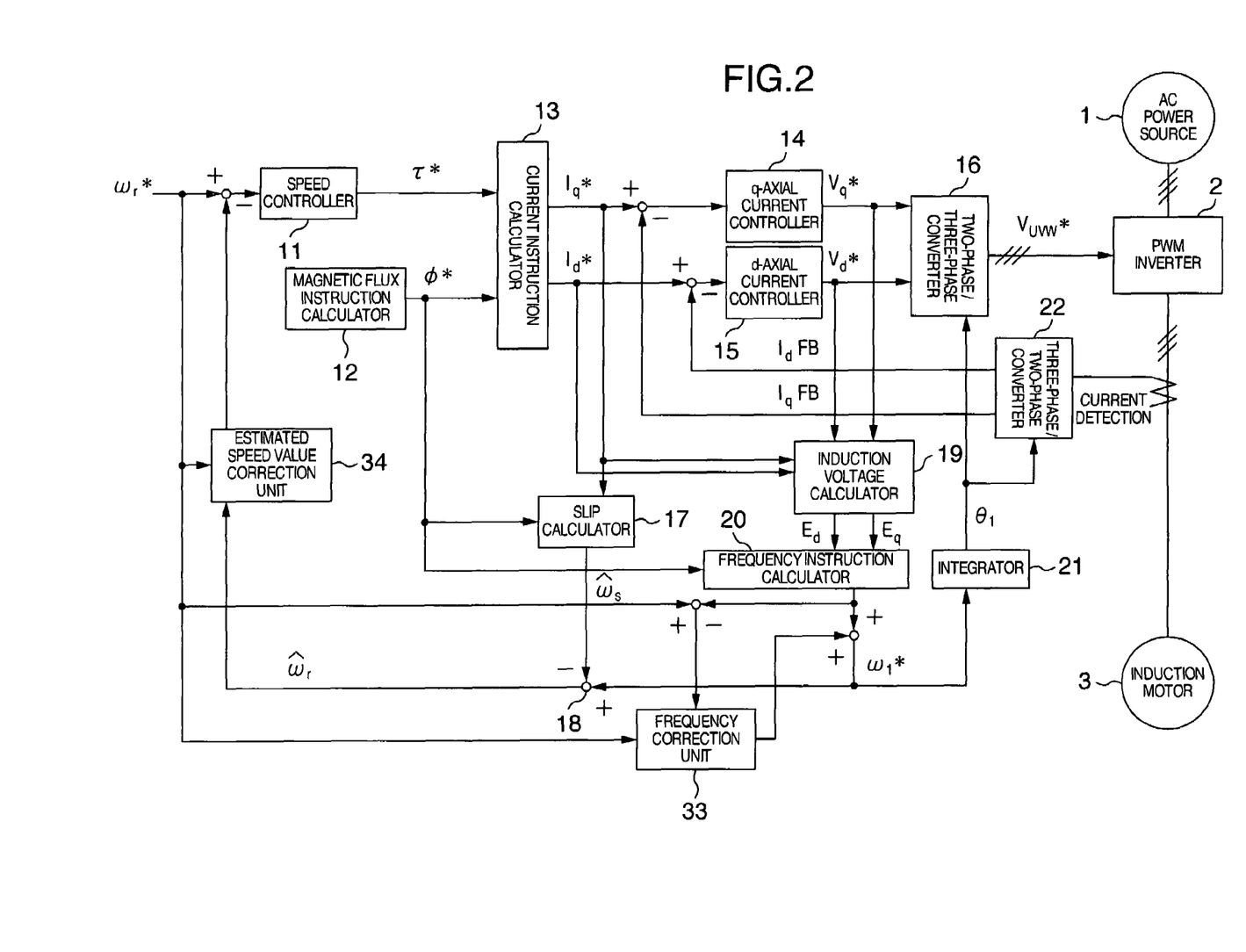
FIG. 2 is a diagram showing the configuration of a motor driving apparatus according to a second embodiment of the present invention.

While referring to FIG. 2, a portion of a second embodiment that differs from the first embodiment will now be described. In this embodiment, an estimated speed value correction unit 34 is provided, instead of the torque instruction calculator 31 in FIG. 1, and at the time of activation, an estimated speed value is reduced. According to this arrangement, a speed controller 11 is only controlled in accordance with a speed instruction value ωr*, and as in the first embodiment, calculation of an excited current instruction Id*, a torque current instruction Iq* and a frequency instruction value ω1* is performed in accordance with the speed instruction value ωr*. Thus, the adverse effect of the estimated speed error can be removed, and a desired torque can be generated at the time of activation.

Third Embodiment

Figure 3:
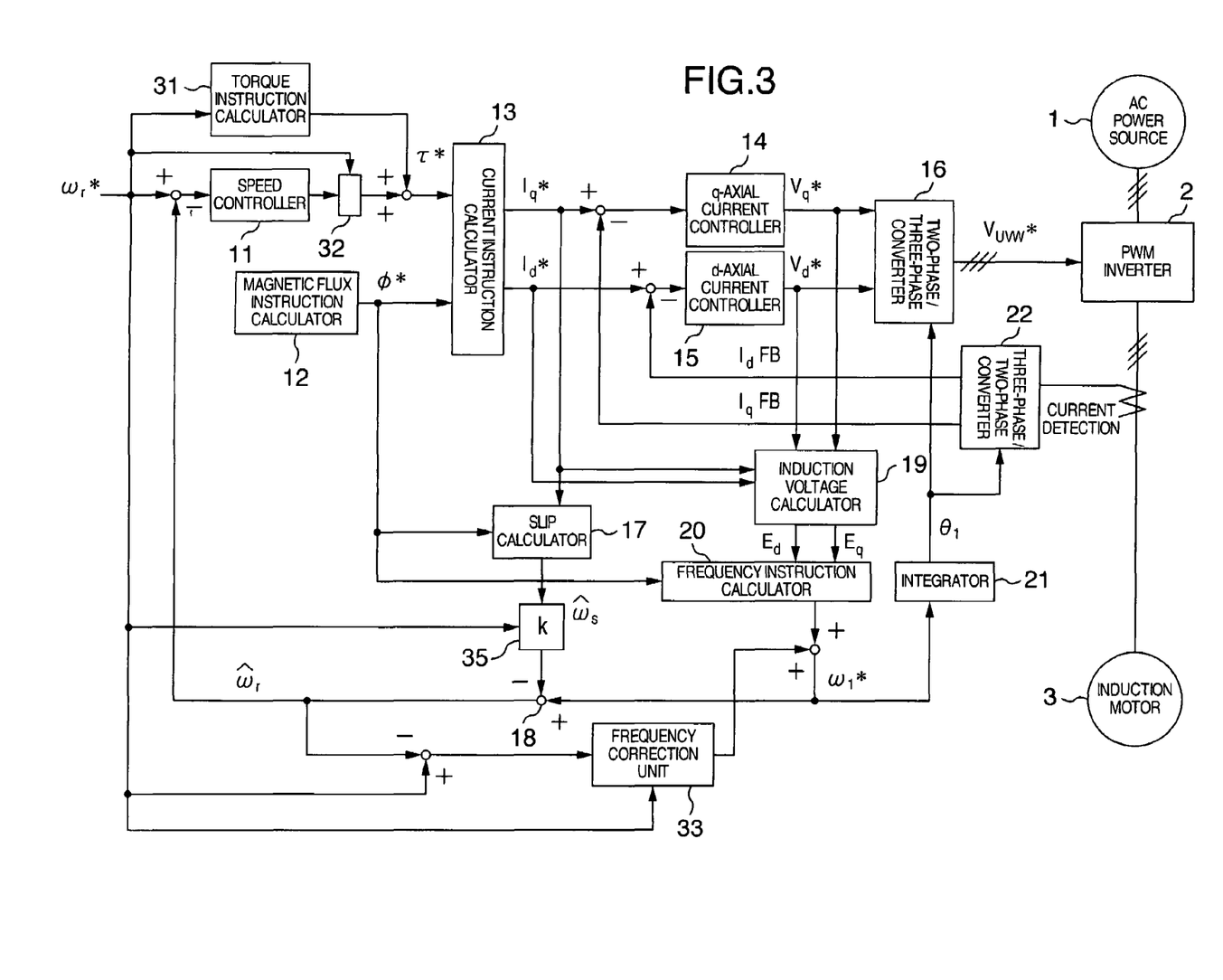
FIG. 3 is a diagram showing the configuration of a motor driving apparatus according to a third embodiment of the present invention.

While referring to FIG. 3, a portion of a third embodiment that differs from the first and second embodiments will now be described. A slip speed correction unit 35 calculates a difference between a frequency instruction value ω1* and a slip speed that is k times the output of a slip calculator 17, and obtains an estimated speed value $\hat{\omega r}$. In this case, k is equal to or greater than zero and smaller than 1 at the time of activation. After a motor has been activated and has reached a predetermined speed, k is returned to 1. Thereafter, the output of a speed control output correction unit 32 is returned from zero to the value equivalent to the output value of a speed controller 11, and the outputs of a torque instruction calculator 31 and a frequency correction unit 33 are reduced to zero. The determination relative to the time of activation and after the activation is performed in the same manner as in the first embodiment. In this embodiment, the frequency instruction value ω1* is calculated using expression (9).

$$\omega 1^* = \omega r^* + \hat{\omega s} \times k \qquad (9)$$

In this embodiment, since k is zero at the time of activation, as in the first and second embodiments, the effect of the estimated slip speed value $\hat{\omega s}$ can be removed, and an excited current instruction Id*, a torque current instruction Iq* and the frequency instruction value ω1* can be controlled in accordance with the speed instruction value ωr*. Further, at the time of activation, an actual slip speed ωs, (the frequency instruction value ω1* at the time of activation)/the current, can be adjusted until lower than after the motor has been activated, and a desired torque can be generated.

Furthermore, according to expression (4), the estimated slip speed value $\hat{\omega s}$/(the torque current instruction Iq*/the magnetic flux instruction Φ*)=M/T2×k is established. This value is k times smaller at the time of activation (0≦k<1) than after the activation (k=1). Likewise, when the magnetic flux instruction is constant, the estimated slip speed value $\hat{\omega s}$/the torque current instruction Iq* is k times (0≦k<1) smaller at the time of activation than after the activation. At this time, the torque current detection value IqFB may be employed, instead of the torque current instruction Iq*. In addition, since the actual torque current Iq is generally greater than the actual excited current Id, the actual torque current Iq may be regarded as current $I1=\sqrt{(IqFB^2+IdFB^2)} \approx Iq$, and may be replaced by I1. Moreover, since the torque current instruction Iq* in expression (4) is proportional to the torque instruction τ*/the magnetic flux instruction Φ*, accordingly, the estimated slip speed value $\hat{\omega s}$ is also proportional to the torque instruction τ*/(magnetic flux instruction $Φ^{*2}$). Therefore, the estimated slip speed value $\hat{\omega s}$/(the torque instruction τ*/(the magnetic flux instruction $Φ^{*2}$)=a fixed value×k is established, and this value is k times (0≦k<1) smaller at the time of activation than after the activation (k=1). Similarly, when the magnetic flux instruction Φ*=M×excited current instruction Id* is defined, the estimated slip speed value $\hat{\omega s}$/(the torque current instruction Iq*/the excited current instruction Id*) is k times smaller at the time of activation than after the activation. The same thing is applied when the excited current instruction Id* is replaced by the excited current detection value IdFB. The same effects are obtained by correcting a physical quantity used for slip calculation, instead of correcting the output of the slip calculator 17 in FIG. 3. For example, the torque current instruction Iq* may be multiplied k times, or the magnetic flux instruction Φ* may be multiplied 1/k times.

In addition, when the speed instruction value ωr* is changed (e.g., for acceleration), it is assumed, based on expression (4), that the magnitude and the change rate of the actual torque current Iq are considerably greater than those of the actual excited current Id. Therefore, the change Δωŝ of the estimated slip speed value ωŝ is represented by expression (10). In expression (10), ΔIq* is replaced by output current change width ΔI.

$$\Delta \omega \hat{s} = 1/T2 \times M \times \Delta I / \Phi^* \times k \tag{10}$$

When the change width of the speed instruction value ωr* is unchanged at the time of activation and after the activation, the difference in the change width of the frequency instruction value ω1* between at the time of activation and after the activation is equal to the difference in the change width of the estimated slip speed ωŝ. Therefore, under a condition wherein the change width of the speed instruction value ωr* is equal, for example, to a condition wherein the change widths are regarded as equal so long as the difference in the two is within 1% of the rated speed, Δω^/ΔI is smaller by k at the time of activation than after the activation. That is, the ratio of the change of the output frequency to the change of the output current is smaller at the time of activation than after the activation.

As described above, the slip speed is increased less at the time of activation than after the activation. And as in the first and second embodiments, the magnetic flux reduction is reduced and a desired torque is generated. Further, as in the first embodiment, since the output of the frequency instruction calculator 20 is corrected based on a deviation between the speed instruction value ωr* and the output of the frequency instruction calculator 20, the same effects can be acquired as are obtained in the first embodiment. Further, when the slip speed correction unit 35 is provided to process the output of the slip calculator 17 in the second embodiment, the same effects can be acquired as are obtained in this embodiment.

Fourth Embodiment

Figure 4:
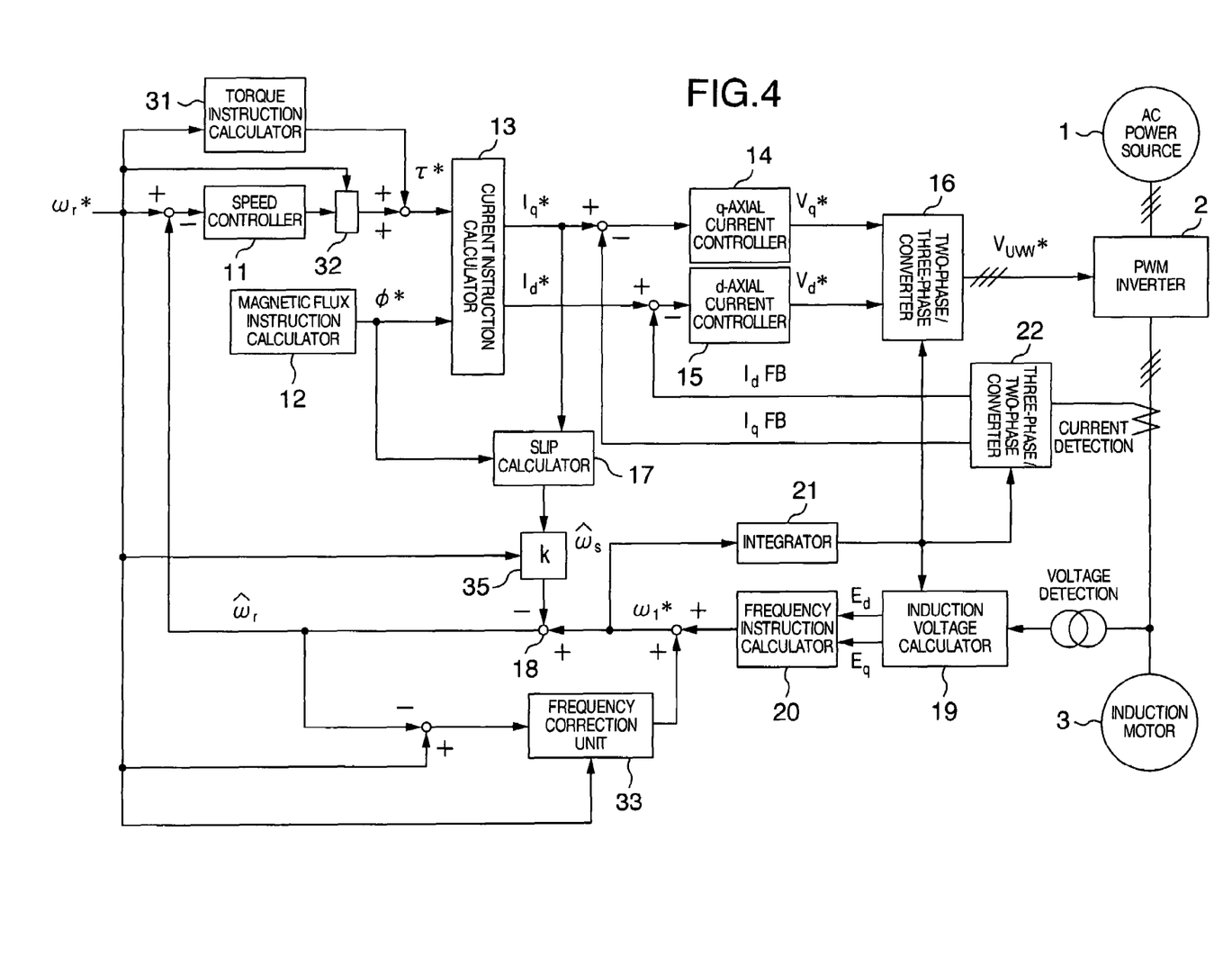
FIG. 4 is a diagram showing the configuration of a motor driving apparatus according to a fourth embodiment of the present invention.

While referring to FIG. 4, a portion of a fourth embodiment that differs from the first to the third embodiments will now be described. In this embodiment, a voltage detection value is employed, and a frequency instruction value ω1* is calculated by an induction voltage calculator 19 and a frequency instruction calculator 20. In this embodiment, the frequency instruction value ω1* is obtained based on a voltage detection value, instead of on a voltage instruction value, and the same effects an be acquired as are obtained in the third embodiment. Further, as in the first embodiment, the output of the frequency instruction calculator 20 is corrected based on a deviation between a speed instruction value ωr* and the output of the frequency calculator 20, so that the same effects are acquired as are obtained in the second embodiment. Furthermore, when, as shown in FIG. 4, the frequency instruction value ω1* is calculated by the induction voltage calculator 19 and the frequency instruction calculator 20 using the voltage detection value, the same effects can be acquired as are obtained in the second embodiment. In addition, as described in the third embodiment, when the slip speed correction unit 35 is provided to handle the output of the slip calculator 17, the same effects can be acquired as are provided in the third embodiment.

Fifth Embodiment

Figure 5:
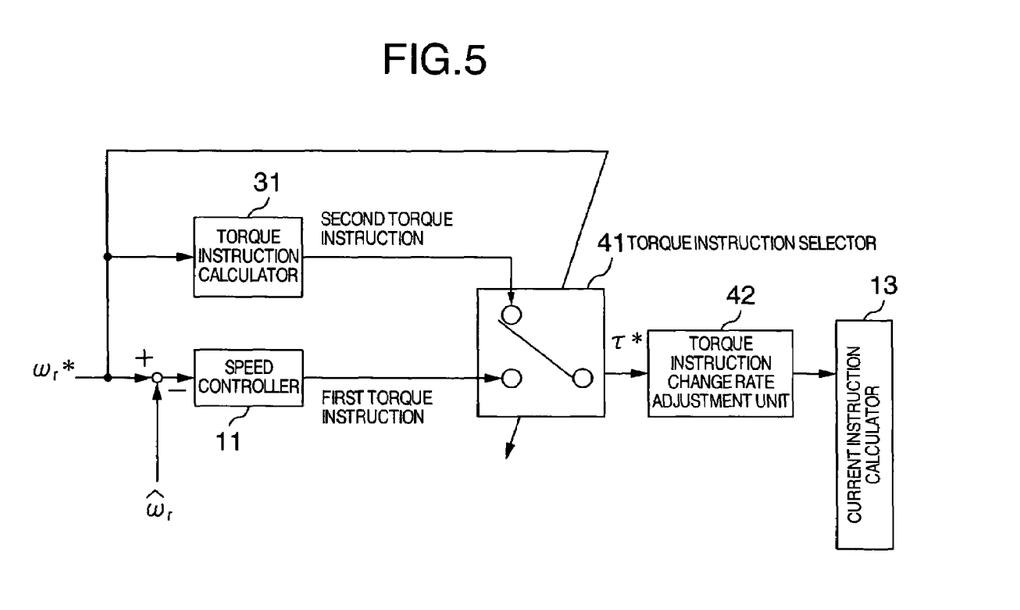
FIG. 5 is a diagram showing the configuration of a motor driving apparatus according to a fifth embodiment of the present invention.

While referring to FIG. 5, a portion of a fifth embodiment that differs from the first to the fourth embodiments will now be described. In this embodiment, a first torque instruction and a second torque instruction are calculated by a speed controller 11 and a torque instruction calculator 31. At the time of activation, the second torque instruction is employed, and when the motor has been activated and has reached a predetermined speed or greater, the first torque instruction is employed. When a torque instruction selector 41 determines the time of activation, the second torque instruction is output. When it is determined that the motor has been activated, the first torque instruction is output. In order to prevent the rapid altering of the torque instruction by this switching, a torque instruction change rate adjustment unit 42 smoothly changes the torque instruction. The torque instruction change rate adjustment unit 42, for example, is a rate limiter or a primary delay circuit.

Sixth Embodiment

Figure 6:
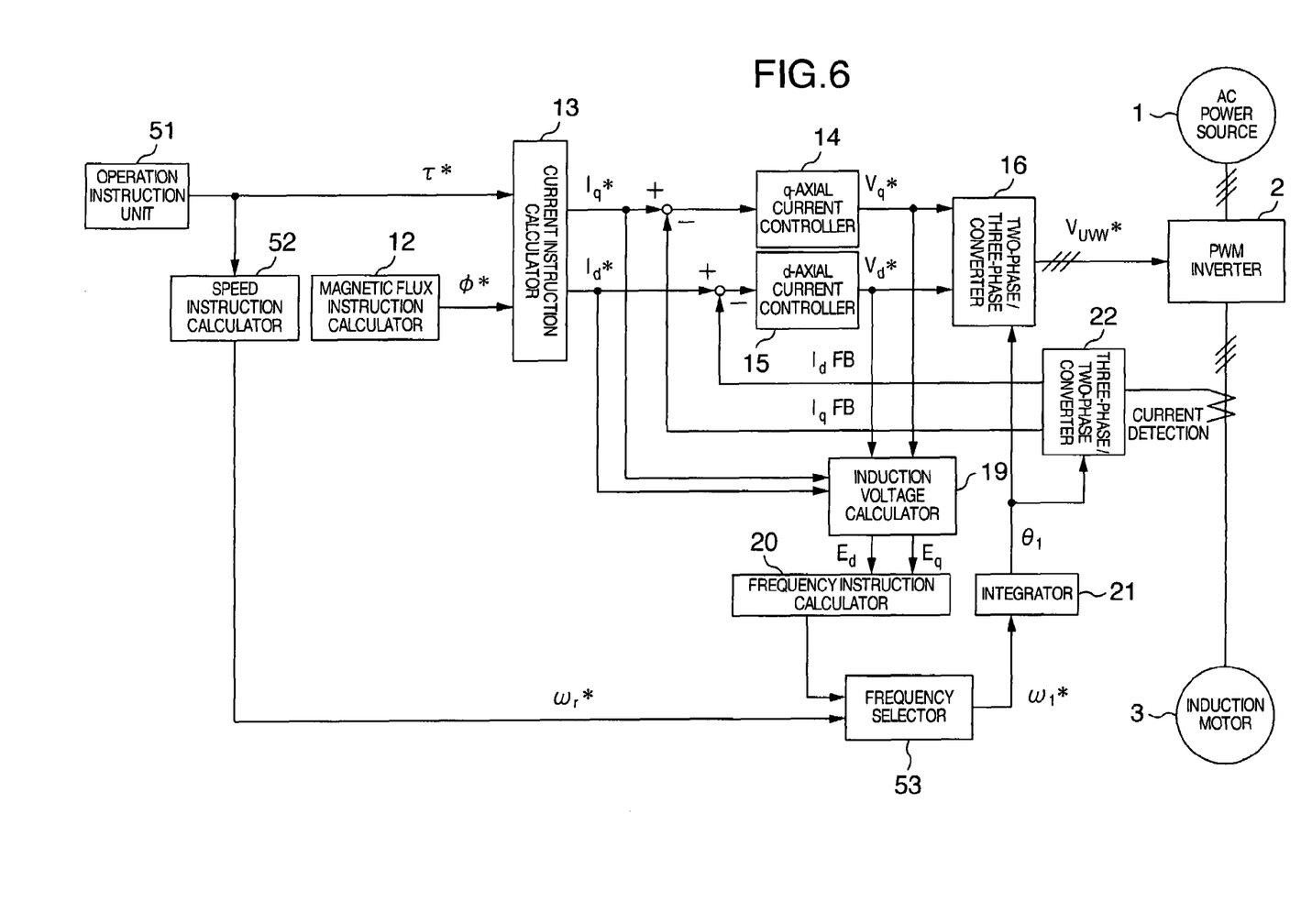
FIG. 6 is a diagram showing the configuration of a motor driving apparatus according to a sixth embodiment of the present invention.

While referring to FIG. 6, a portion of a sixth embodiment that differs from the first to fifth embodiments will now be described. In this embodiment, a torque instruction τ* is output as an operating instruction by an operation instruction unit 51, and an excited current instruction Id* and a torque current instruction Iq* are calculated in accordance with the torque instruction τ*. In the conventional example, a frequency instruction value ω1* is calculated based only on a voltage instruction value or a voltage detection value. However, in this embodiment, a speed instruction calculator 52 calculates a speed instruction value ωr*, and a frequency selector 53 selects, at the time of activation, the frequency instruction value ω1*=the speed instruction value ωr*=the actual slip speed ωs, and after the activation, outputs the frequency instruction value ω1* (>the actual slip speed ωs) obtained by the frequency instruction calculator 20, as in the conventional example. At this time, the speed instruction value ωr* is proportional to the torque instruction τ*. The actual torque current Iq flows in consonance with the torque current instruction Iq* that is proportional to the torque instruction τ*, and at the time of activation, the inverter frequency ω1=speed instruction value ωr*. Therefore, the frequency and the current are proportional to the torque instruction τ*. Thus, the ratio of the frequency to the current at the time of activation is a predetermined value, e.g., a constant value. Further, a speed instruction calculator 52 is controlled, so that at the time of activation, the actual slip speed ωs, (the frequency instruction value ω1* at the time of activation)/the current, is smaller than after the activation. It should be noted that the estimated slip speed value ωŝ calculation means is not shown in FIG. 7; however, after the motor has been activated, the actual speed ωs is generated by expression (11).

$$\omega s = 1/T2 \times M \times Iq/\Phi \tag{11}$$

Further, the torque instruction τ* is gradually increased, and the ratio of the change of the frequency to the change of the current at the time of activation is adjusted to a predetermined value, i.e., a constant value. This value is smaller at the time of activation than after the activation. In this embodiment, as in the above embodiments, at the time of activation, the adverse effects of the frequency instruction ω1* error and the speed estimation error, which are conventionally caused by calculation of a voltage instruction or a voltage detection value, can be removed, and a desired torque can be generated. In this embodiment, the same effects can be obtained when, as in the fourth embodiment, the frequency instruction value ω1* is calculated by employing a voltage detection value.

Seventh Embodiment

Figure 7:
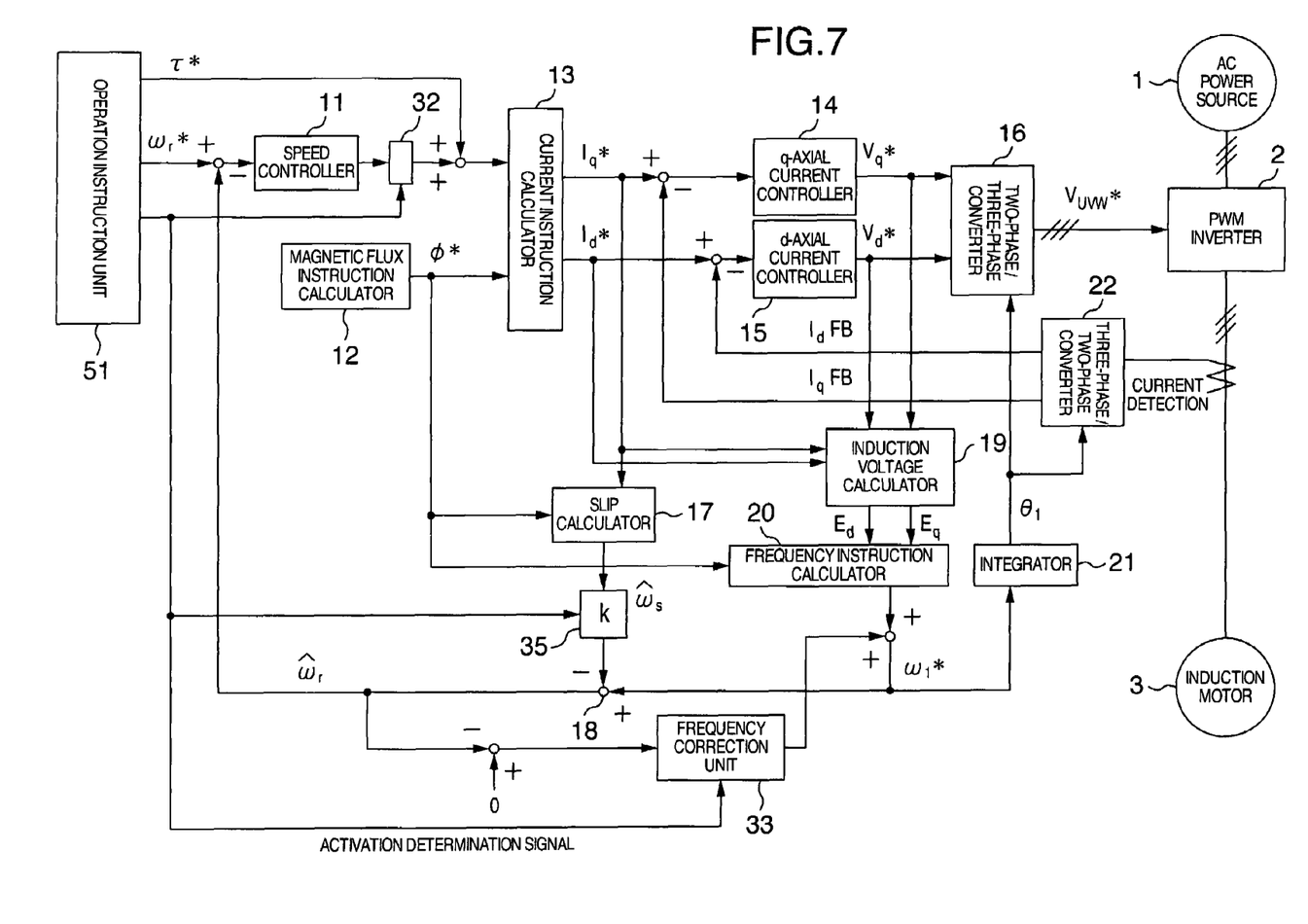
FIG. 7 is a diagram showing the configuration of a motor driving apparatus according to a seventh embodiment of the present invention.

While referring to FIG. 7, a portion of a seventh embodiment that differs from the first to the sixth embodiments will now be described. In this embodiment, a torque instruction τ*, a speed instruction value ωr* and an activation determination signal are output as operating instructions by an operation instruction unit 51. At the time of activation, an excited current instruction Id* and a torque current instruction Iq* are calculated based on the torque instruction τ*, and in accordance with the activation determination signal, a speed control output correction unit 32 reduces the output level of a speed controller 11. As in the first embodiment, the activation determination signal is obtained by employing a speed instruction value ωr*, a time and a corresponding torque value. A frequency correction unit 33 corrects a frequency instruction value ω1*, so that an estimated speed value ωr^ is zero.

Since the frequency instruction value ω1*=the estimated slip speed value ωs^ is established, a slip speed correction unit 35 is adjusted to control the frequency instruction value ω1*. By adjusting the slip speed correction unit 35 at the time of activation, a frequency and a current can be controlled in accordance with operating instructions. As a result, at the time of activation, a predetermined ratio of the frequency to the current and a predetermined ratio of changes can be maintained. Therefore, as in the above embodiments, a desired torque can be generated without being affected by errors, such as a speed estimation error. After the motor has been activated, the output level of the frequency correction unit 33 is reduced, the torque instruction τ* is lowered, and the control process, as conventionally performed, is executed by employing the output of the speed controller 11 that is received from the speed control output correction unit 32.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A motor driving apparatus, which drives an induction motor, comprising:
    a current instruction calculator, for calculating a current instruction value based on a deviation between a speed instruction value and an estimated speed value;
    a current controller, for controlling an output current based on the current instruction value;
    a frequency instruction calculator, for calculating a frequency instruction value based on an output voltage instruction value or on an output voltage detection value;
    wherein, when the induction motor is to be activated, the current instruction value and the frequency instruction value are calculated using the speed instruction value, and an output current and an output frequency are controlled in accordance with the current instruction value and the frequency instruction value;
    wherein the current instruction calculator includes:
    a speed controller, for receiving a difference between a speed instruction value and an estimated speed value and outputting a first torque instruction;
    a speed control output correction unit, for, when the induction motor is to be activated, reducing the first torque instruction output by the speed controller; and
    a torque calculation instruction unit, for receiving the speed instruction value and outputting a second torque instruction value; and
    wherein, when the induction motor is to be activated, the magnitude of the first torque instruction value is reduced, and a current instruction value is calculated based on the second torque instruction value.

2. A motor driving apparatus, which drives an induction motor, comprising:
    a current instruction calculator, for calculating a current instruction value based on a deviation between a speed instruction value and an estimated speed value;
    a current controller, for controlling an output current based on the current instruction value;
    a frequency instruction calculator, for calculating a frequency instruction value based on an output voltage instruction value or on an output voltage detection value;
    wherein, when the induction motor is to be activated, the current instruction value and the frequency instruction value are calculated using the speed instruction value, and an output current and an output frequency are controlled in accordance with the current instruction value and the frequency instruction value;
    wherein the current instruction calculator includes:
    a speed controller, for receiving a difference between a speed instruction value and an estimated speed value and outputting a first torque instruction;
    a speed control output correction unit, for, when the induction motor is to be activated, reducing the first torque instruction output by the speed controller; and
    a torque calculation instruction unit, for receiving the speed instruction value and outputting a second torque instruction value;
    wherein, when the induction motor is to be activated, a current instruction value is calculated by employing the second torque instruction value; and
    wherein, when the induction motor is rotating at a predetermined speed or greater, a current induction value is calculated based on the first torque instruction value.

3. A motor driving apparatus, which drives an induction motor, comprising:
    a current instruction calculator, for calculating a current instruction value based on a deviation between a speed instruction value and an estimated speed value;
    a current controller, for controlling an output current based on the current instruction value;
    a frequency instruction calculator, for calculating a frequency instruction value based on an output voltage instruction value or on an output voltage detection value;
    wherein, when the induction motor is to be activated, the current instruction value and the frequency instruction value are calculated using the speed instruction value, and an output current and an output frequency are controlled in accordance with the current instruction value and the frequency instruction value; and
    wherein, when the induction motor is to be activated, in accordance with a change width of the speed instruction value, the current instruction calculator controls a change width of an output current and the frequency instruction calculator controls a change width of an output frequency.

4. A motor driving apparatus, which drives an induction motor, comprising:
a current instruction calculator, for calculating a current instruction value based on a deviation between a speed instruction value and an estimated speed value;
a current controller, for controlling an output current based on the current instruction value;
a frequency instruction calculator, for calculating a frequency instruction value based on an output voltage instruction value or on an output voltage detection value;
wherein, when the induction motor is to be activated, the current instruction value and the frequency instruction value are calculated using the speed instruction value, and an output current and an output frequency are controlled in accordance with the current instruction value and the frequency instruction value; and
wherein a ratio of the output frequency to the output current is adjusted to a predetermined value when the induction motor is to be activated.

5. A motor driving apparatus, which drives an induction motor, comprising:
a current instruction calculator, for calculating a current instruction value based on a deviation between a speed instruction value and an estimated speed value;
a current controller, for controlling an output current based on the current instruction value;
a frequency instruction calculator, for calculating a frequency instruction value based on an output voltage instruction value or on an output voltage detection value;
wherein, when the induction motor is to be activated, the current instruction value and the frequency instruction value are calculated using the speed instruction value, and an output current and an output frequency are controlled in accordance with the current instruction value and the frequency instruction value; and
wherein a ratio of a slip speed to an output current when the induction motor is to be activated is smaller than a ratio of a slip speed to an output current when the induction motor has been activated and is rotating at a predetermined speed.

6. A motor driving apparatus, which drives an induction motor, comprising:
a current instruction calculator, for calculating a current instruction value based on a deviation between a speed instruction value and an estimated speed value;
a current controller, for controlling an output current based on the current instruction value;
a frequency instruction calculator, for calculating a frequency instruction value based on an output voltage instruction value or on an output voltage detection value;
wherein, when the induction motor is to be activated, the current instruction value and the frequency instruction value are calculated using the speed instruction value, and an output current and an output frequency are controlled in accordance with the current instruction value and the frequency instruction value; and
wherein the ratio of the change width of the output frequency to the change width of the output current when the induction motor is to be activated is smaller than the ratio of the change width of the output frequency to the change width of the output current when the induction motor has been activated and is rotating at a predetermined speed.

7. A motor driving apparatus, which drives an induction motor, comprising:
a current instruction calculator, for calculating a current instruction value based on a deviation between a speed instruction value and an estimated speed value;
a current controller, for controlling an output current based on the current instruction value;
a frequency instruction calculator, for calculating a frequency instruction value based on an output voltage instruction value or on an output voltage detection value;
wherein, when the induction motor is to be activated, the current instruction value and the frequency instruction value are calculated using the speed instruction value, and an output current and an output frequency are controlled in accordance with the current instruction value and the frequency instruction value;
wherein, when the induction motor is to be activated, the current instruction calculator calculates a current instruction value by adding the speed instruction value, and controls the output frequency in accordance with the speed instruction value; and
wherein, under a condition wherein the change width of the speed instruction value is unchanged, the ratio of the change width of the output frequency to the change width of the output current when the induction motor is to be activated is adjusted until smaller than the ratio of the change width of the output frequency to the change width of the output current when the induction motor has been activated and is rotating at a predetermined speed or greater.

8. A motor driving apparatus, which drives an induction motor, comprising:
a current instruction calculator, for calculating a current instruction value based on a deviation between a speed instruction value and an estimated speed value;
a current controller, for controlling an output current based on the current instruction value;
a frequency instruction calculator, for calculating a frequency instruction value based on an output voltage instruction value or an output voltage detection value; and
a slip calculator, for calculating a slip speed for the induction motor,
wherein the slip calculator calculates the slip speed of the induction motor based on either a torque current element of the current instruction value or a torque current detection value, and either a magnetic flux instruction value or an excited current instruction value, and
wherein, when the induction motor is to be activated, either a ratio of the slip speed calculation value to the torque current instruction value, or a ratio of the slip speed calculation value to the torque current detection value, is adjusted until smaller than either a ratio of a slip speed calculation value to a torque current instruction value, or a ratio of a slip speed calculation value to a torque current detection value when the induction motor has been activated and is rotating at a predetermined speed or greater.

9. A motor driving apparatus according to claim 8, wherein, when the induction motor is to be activated, instead of either the ratio of the slip speed calculation value to the torque current instruction value, or the ratio of the slip speed calculation value to the torque current detection value, a ratio of the slip speed calculation value to {(either a torque current instruction value or a detection value)/(a magnetic flux instruction value, an excited current instruction value or an excited current detection value)} is adjusted until smaller than a ratio of the slip speed calculation value to {(a torque current instruction value or a detection value)/(a magnetic flux instruction value, an excited current instruction value or an excited current detection value)} when the induction motor has been activated and is rotating at the predetermined speed or greater.

10. A motor driving apparatus according to claim 8, wherein, when the induction motor is to be activated, instead of either the ratio of the slip speed calculation value to the torque current instruction value, or the ratio of the slip speed calculation value to the torque current detection value, a ratio of the slip speed calculation value to {a torque instruction value/(the square of a magnetic flux instruction value, an excited current instruction value or an excited current detection value)} is adjusted until smaller than a ratio of the slip speed calculation value to {a torque instruction value/(the square of a magnetic flux instruction value, an excited current instruction value or an excited current detection value)} when the induction motor has been activated and is rotating at the predetermined speed or greater.

11. A motor driving apparatus which drives an induction motor, comprising:
- an operation instruction unit, for outputting an operating instruction;
- a current instruction calculator, for calculating a current instruction value based on a deviation between a speed instruction value and an estimated speed value;
- a current controller, for controlling an output current based on the current instruction value;
- a frequency instruction calculator, for calculating a frequency instruction value based on an output voltage instruction value or an output voltage detection value;
- wherein, when the induction motor is to be activated, the current instruction value and the frequency instruction value are calculated using the operating instruction value, and an output current and an output frequency are controlled in accordance with the current instruction value and the frequency instruction value;
- wherein the operating instruction value is a torque instruction,
- wherein a speed instruction calculator, for receiving the torque instruction and outputting a speed instruction value is also provided; and
- wherein, when the induction motor is to be activated, in accordance with a change width of the speed instruction value, the current instruction calculator controls a change width of an output current and the frequency instruction calculator controls a change width of an output frequency.

12. A motor driving apparatus according to claim 11, wherein, when the induction motor is to be activated, the speed instruction value is increased up to a predetermined value at a predetermined time change rate.

13. A motor driving apparatus which drives an induction motor, comprising:
- an operation instruction unit, for outputting an operating instruction;
- a current instruction calculator, for calculating a current instruction value based on a deviation between a speed instruction value and an estimated speed value;
- a current controller, for controlling an output current based on the current instruction value;
- a frequency instruction calculator, for calculating a frequency instruction value based on an output voltage instruction value or an output voltage detection value;
- wherein, when the induction motor is to be activated, the current instruction value and the frequency instruction value are calculated using the operating instruction value, and an output current and an output frequency are controlled in accordance with the current instruction value and the frequency instruction value; and
- wherein a ratio of the output frequency to the output current is adjusted to a predetermined value when the induction motor is to be activated.

14. A motor driving apparatus which drives an induction motor, comprising:
- an operation instruction unit, for outputting an operating instruction;
- a current instruction calculator, for calculating a current instruction value based on a deviation between a speed instruction value and an estimated speed value;
- a current controller, for controlling an output current based on the current instruction value;
- a frequency instruction calculator, for calculating a frequency instruction value based on an output voltage instruction value or an output voltage detection value;
- wherein, when the induction motor is to be activated, the current instruction value and the frequency instruction value are calculated using the operating instruction value, and an output current and an output frequency are controlled in accordance with the current instruction value and the frequency instruction value; and
- wherein a ratio of a slip speed to an output current when the induction motor is to be activated is smaller than a ratio of a slip speed to an output current when the induction motor has been activated and is rotating at a predetermined speed.

15. A motor driving apparatus which drives an induction motor, comprising:
- an operation instruction unit, for outputting an operating instruction;
- a current instruction calculator, for calculating a current instruction value based on a deviation between a speed instruction value and an estimated speed value;
- a current controller, for controlling an output current based on the current instruction value;
- a frequency instruction calculator, for calculating a frequency instruction value based on an output voltage instruction value or an output voltage detection value;
- wherein, when the induction motor is to be activated, the current instruction value and the frequency instruction value are calculated using the operating instruction value, and an output current and an output frequency are controlled in accordance with the current instruction value and the frequency instruction value; and
- wherein the ratio of the change width of the output frequency to the change width of the output current when the induction motor is to be activated is smaller than the ratio of the change width of the output frequency to the change width of the output current when the induction motor has been activated and is rotating at a predetermined speed.

* * * * *